United States Patent [19]

Kluger et al.

[11] 4,293,682
[45] Oct. 6, 1981

[54] NITROGEN CONTAINING COMPOUNDS AND COMPOSITIONS

[75] Inventors: Edward W. Kluger, Pauline; Tien-Kuei Su, Spartanburg, both of S.C.

[73] Assignee: Milliken Research Corporation, Spartanburg, S.C.

[21] Appl. No.: 148,084

[22] Filed: May 12, 1980

[51] Int. Cl.³ .............................................. C08G 59/50
[52] U.S. Cl. .................................. 528/123; 528/407; 564/503; 564/512
[58] Field of Search ............... 528/123, 407; 564/503, 564/512

[56] References Cited

U.S. PATENT DOCUMENTS 3,151,160 9/1964 Spivack ............................ 260/570.5
3,280,074 10/1966 McCaleb et al. ............... 564/512 X
3,929,716 12/1975 Komoto et al. ...................... 528/123

*Primary Examiner*—Earl A. Nielsen
*Attorney, Agent, or Firm*—H. William Petry; Terry T. Moyer

[57] ABSTRACT

Nitrogen-containing compounds are provided which may be represented structurally as:

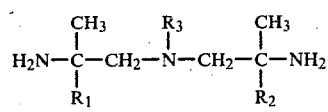

wherein $R_1$ and $R_2$ are each independently selected from hydrogen and lower alkyl and $R_3$ is selected from hydrogen, lower alkyl, aryl and

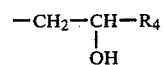

wherein $R_4$ is selected from H and lower alkyl.

14 Claims, No Drawings

NITROGEN CONTAINING COMPOUNDS AND COMPOSITIONS

This invention relates to novel chemical compositions. In one aspect it relates to novel nitrogen-containing compositions. In another aspect it relates to novel amine compositions. In yet another aspect, the invention relates to polyamine-containing epoxy curing agents.

Chemical compositions, particularly novel chemical compositions, are constantly being sought by the chemical industry. Such chemical compositions are generally sought to improve properties of existing compositions, or as intermediates to provide chemical compositions having improved physical, chemical and/or toxicological properties. Heretofore, compositions which have been employed in the production of numerous products, such as polyurethane foams, polyamides, and curing agents for resinifying polyepoxides, have become suspect as possessing toxicological properties which are believed to be hazardous to those working with or employing such compounds. Therefore, new and improved chemical compositions, including intermediate products or adducts, are constantly being sought which can be economically produced and which do not possess suspect toxicological and other undesirable properties. Further, with the wide use of polyepoxides, and the need of curing or resinifying agents for such polyepoxides, new and improved epoxy curing agents are being sought which do not possess obnoxious odors, cause irritation to the skin of the operator, or possess other hazardous and/or toxicological properties. However, in obtaining new curing or resinifying agents for polyepoxides, the resulting products must have sufficient hardness and strength, often at elevated temperatures. Further, it is extremely desirable that the cured polyepoxide compositions have substantial resistance to water and/or solids.

Accordingly, the present invention provides novel chemical compositions and in particular novel nitrogen-containing compositions which may not create toxicological problems for the processor or user of such compounds. Further, the present invention provides new and improved curing and resinifying agents for polyepoxides which may not emit obnoxious odors, and which may not possess toxicological properties and which may not sacrifice the desired hardness and strength of cured products.

According to the present invention, novel, non-aromatic, nitrogen containing compounds have been discovered which may be employed as epoxy curing agents, as intermediates for the preparation of epoxy curing agents and fuel oil additives, as intermediates for the production of polyurethane foams and polyamides. The compounds may be economical to manufacture, lack undesired toxicological properties, and in most instances they may be equivalent to or superior to the prior art compositions employed in such uses.

Broadly, the present invention resides in novel, nitrogen-containing compounds represented structurally as follows:

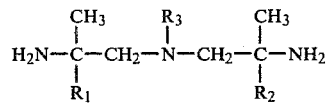

wherein $R_1$ and $R_2$ are each independently selected from hydrogen and lower alkyl and $R_3$ is selected from hydrogen, lower alkyl, aryl and

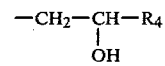

wherein $R_4$ is selected from H and lower alkyl.

As used herein the term "lower alkyl" means a univalent aliphatic radical containing from one to about five carbon atoms. The term "aryl" as used herein refers to a univalent aromatic and substituted aromatic radical containing from six to about ten carbon atoms.

The nitrogen-containing compounds of the present invention may be conveniently prepared in a two step preparation procedure. According to the first step an intermediate bis(2-nitroalkyl) amine may be prepared by a nitroparaffin with an aldehyde such as formaldehyde and ammonia or an amine, according to the following generalized reaction:

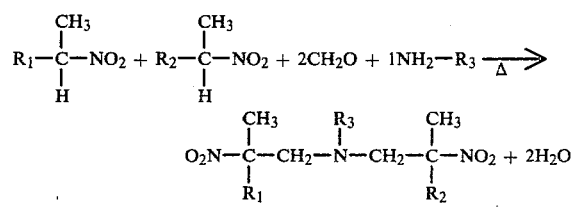

wherein in the above equation $R_1$, $R_2$ and $R_3$ have the same meaning as set forth above. The nitroparaffin set forth above as a starting material for the reaction may belong to a group of commonly available nitroparaffins such as nitromethane, nitroethane, 1-nitropropane, 2-nitropropane, and high order nitroparaffins containing up to about ten carbon atoms. Particularly good results may be obtained using 2-nitropropane, which is preferred. In addition to ammonia other alkyl amines such as methylamine, ethylamine, propylamine and other alkyl amines containing up to about twenty carbon atoms may be employed. Other monoamines such as aryl amines, e.g., aniline, may also be employed. Aminoalcohols, for instance, aminoalcohols containing up to about seven carbon atoms may be employed. Especially useful aminoalcohols are monoethanol amine and monoisopropanol amine, which are preferred.

In addition to preparing the bis(2-nitroalkyl)amines by the above-described in situ reaction of nitroparaffin, aldehyde and ammonia or amine, the bis(2-nitroalkyl)amines may be prepared in a two step process by first reacting the aldehyde with the nitroparaffin and then reacting the nitro alcohol with the ammonia or amine in a separate reaction as follows:

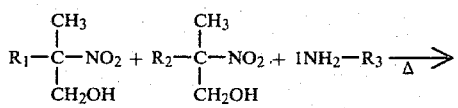

-continued

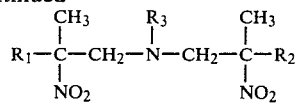

wherein $R_1$, $R_2$ and $R_3$ are as defined above. The reaction of nitroparaffin, formaldehyde and ammonia or amine may be carried out at a temperature of from about 20° C. to the boiling point of the mixture. The preferred temperature is from about 75° C. to about 120° C. The use of a solvent is not critical in the preparation of bis(2-nitroalkyl)amines. However, the use of a mutual solvent provides a homogeneity for all the reactants and facilitates mixing. Lower alcohols such as methyl alcohol, ethyl alcohol and isopropyl alcohol are preferred.

At least stoichiometric amounts of 2-nitropropane, formaldehyde and ammonia or amine may be used. Excess formaldehyde and/or ammonia or amine may be used without adverse effect. The preferred molar ratio is about 2 moles of nitroparaffin, about 2 moles of formaldehyde, and about one mole of ammonia or amine. When the nitro-alcohol is used in place of the in situ procedure, 2 moles of nitro-alcohol may be used per one mole of ammonia or amine.

The crude bis(2-nitroalkyl)amine may then be isolated by any convenient means as, for instance, by recrystallizing in alcohol and may then be reduced to the triamino compound with hydrogen and a suitable metal catalyst according to the following equation:

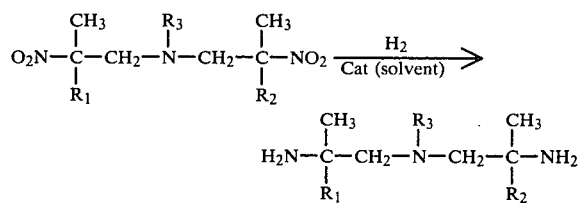

wherein $R_1$, $R_2$ and $R_3$ are as defined above.

The triamino compound(s) was prepared by passing hydrogen through a catalyst containing a solution of bis(2-nitroalkyl)amine in suitable solvent. Solvents include lower weight alcohols such as methyl alcohol, ethyl alcohol and isopropyl alcohol; ethers such as dioxane; hydrocarbons such as benzene, toluene, xylenes, cyclohexane, and petroleum ether; and mixtures of lower weight alcohols and water such as about equal parts by weight of ethyl alcohol and water. The amount of solvent is not critical. The preferred solvent is methyl alcohol in an amount of about 30 percent to about 80 percent by weight.

Any suitable reduction catalyst may be used to catalyze the reduction of the bis(2-nitroalkyl)amine to the triamino compound. Catalysts such as Raney nickel; nickel oxides; finely divided metals such as iron, cobalt, platinum, ruthenium, osmium, and rhodium may be used. Furthermore, metal catalysts supported on pumice, asbestos, kieselguhr, alumina, silica gel or charcoal work equally as well. The amount of catalyst used depends on such reaction variables as temperature, pressure, and time, and it can vary from about 0.025 percent to about 15 percent by weight of the bis(2-nitroalkyl)amine. The preferred catalyst is Raney nickel or supported nickel present from about 0.1 percent to about 15 percent by weight of the bis(2-nitroalkyl)amine. The bis(2-nitroalkyl)amine may be reduced at a temperature of from about 20° C. to about 90° C., although temperatures of from about 40° C. to about 75° C. may be preferred since they may provide faster reaction times and higher yields of triamino compounds. During the reduction of bis(2-nitroalkyl)amines, pressures ranging from about 10 to 3,500 psi, preferably from about 500 to 1,500 psi, of hydrogen may be used. Substantially pure triamines can be separated from the reaction mixture by filtration of the catalyst and insoluble material, distilling off the solvent and thereafter distilling the residue under reduced pressure. Reaction product(s) were characterized by GC-mass spectra, IR, proton NMR, Carbon-13NMR, and elemental analysis.

One particularly important use for the novel compounds of the present invention, is their use as epoxy curing agents for polyepoxides. The polyepoxides which can be cured at elevated temperatures using the polyamine compounds as herein described are those polyepoxides possessing at least two

groups. These groups may be terminal, i.e.,

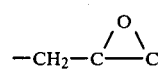

groups, or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art.

The curing of the polyepoxides with the above-described polyamine curing agents of the present invention may be accomplished by simply mixing the two components together. While the reaction between the two components occurs slowly at room temperature, improved results can be obtained if the mixture is heated to a temperature of from about 80° C. to about 150° C. for a period of time of from about 1 to about 2 hours and thereafter post-curing the reaction product for an additional period of time from about 2 to about 5 hours at a temperature of from about 150° C. to about 200° C. With a small casting, curing of the reaction mixture can be obtained by heating the reaction mixture for about 2 hours at a temperature of from about 80° C. to about 150° C. and thereafter post-curing the reaction product at a temperature of from about 150° C. to about 200° C. for an additional 3 hours or so.

In curing polyepoxides it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the polyamine curing agent by evaporation before and/or during the curing of such polyepoxide composition can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ethers of ethylene glycol and chlorinated hydrocarbons, such as chloroform.

In addition to the use of the polyamines of the present invention as epoxy curing agents, many other uses can readily be envisioned by those skilled in the art. As previously stated, not only do the compositions of the present invention find utility as epoxy curing agents but such compositions can be employed as oil and fuel adductive intermediates. Further, the polyamines may be employed for the formation of diisocyanate compositions for the incorporation into polyurethane compositions, and the compound may be further reacted to form novel and useful polyamides.

In order to more fully describe the preparation and use of the novel compounds of the present invention the following examples are given. However, such examples are presented for illustration only and are not to be construed as unduly limiting the scope of the present invention. Unless otherwise indicated, all parts and/or percentages given in these examples are by weight.

EXAMPLE 1

In a 2 liter, three-necked flask equipped with a magnetic stir bar, thermometer, reflux condenser, dropping funnel and heating mantle was placed 174.6 grams (1.96 'moles) of 2-nitropropane and 270 milliliters of concentrated aqueous ammonium hydroxide (28 percent ammonia) and 410 milliliters of ethyl alcohol. The mixture was then heated to reflux and 169 milliliters of 37 percent aqueous formaldehyde was added over one hour. After the formaldehyde was added, the mixture was heated for 5 additional hours at reflux. The reaction mixture was then cooled and the resulting two layers separated. The bottom layer was found to contain mainly bis(2-nitroisopropylmethyl)amine by GLC. Additional bis(2-nitroisopropylmethyl)amine was obtained by extraction of the aqueous layer with methylene chloride. The combined bottom layer and methylene chloride extract amounted to a total overall yield of 171.7 grams, or 80 percent of the bis(2-nitroisopropylmethyl)amine. The crude product was purified by recrystallization from 95 percent ethyl alcohol to give white plates (melting point=30° C). The IR, proton NMR, and GC-mass spectra were consistent with the dinitroamine as was the elemental analysis:

Calculated for $C_8H_{17}N_3O_2$: C, 43.84%; H, 7.76%; N, 19.19%. Found: C, 43.88%; H, 7.66%; N, 19.02%.

EXAMPLE 2

In a 3 liter, three-necked flask equipped with a magnetic stir bar, reflux condenser, thermometer, heating mantle, and gas inlet tube was placed 356 grams (4 moles) of 2-nitropropane, 720 milliliters of 37 percent aqueous formaldehyde and 800 milliliters of ethyl alcohol. Ammonia gas was then bubbled through the solution and the temperature rose to 80° C. When the temperature started to fall, the mixture was then heated to reflux as the ammonia was bubbled into the solution. After five hours, the ammonia source was removed and the reaction mixture was heated at reflux for an additional two hours. On cooling, the reaction mixture separated into two layers. The bottom layer and methylene chloride extract of the top layer combined to give an overall yield of 410.4 grams, or 93.4 percent of bis(2-nitroisopropylmethyl)amine.

EXAMPLE 3

In a 2 liter, three-necked flask equipped with a magnetic stir bar, Dean Stark trap, reflux condenser, and heating mantle was placed 344.1 grams (2.9 moles) of 2-nitro-2-methyl-1-propanol and 88.3 grams (1.5 moles) monoethanolamine along with 300 cubic centimeters of toluene. This mixture was then heated to reflux and 50.5 cubic centimeters of water distilled over in the Dean Stark trap during the course of several hours. The reaction mixture was allowed to reflux until no water distilled over indicating that the reaction was complete. On cooling, the toluene and unreacted starting materials were then distilled away from the product under vacuum (15–20 torr) to give a viscous pale orange product. A yield of 283.3 grams or 74.5 percent of crude bis(2-nitroisopropylmethyl) ethanolamine was obtained. The IR-spectrum was consistent with bis(2-nitroisopropylmethyl) ethanolamine.

EXAMPLE 4

In a 2 liter, three-necked flask equipped with a magnetic stir bar, Dean Stark trap, reflux condenser, and heating mantle was placed 252.0 grams (2.1 moles) of 2-nitro-2-methyl-1-propanol and 64.7 grams (1.1 moles) of monoethanolamine along with 300 cubic centimeters of toluene. This mixture was then heated to reflux and 34.5 cubic centimeters of water distilled over in the Dean Stark trap during the course of several hours. The reaction mixture was allowed to reflux until no water distilled over indicating that the reaction was complete. On cooling, the toluene an unreacted starting materials were then distilled away from the product under vacuum (15–20 torr) to give a viscous pale orange product. A yield of 220.9 grams or 79.3 percent of crude bis(2-nitroisopropylmethyl) ethanolamine was obtained. The IR-spectrum was consistent with bis(2-nitroisopropylmethyl) ethanolamine.

EXAMPLE 5

In a 2 liter, three-necked flask equipped with a magnetic stir bar, Dean Stark trap, reflux condenser, and heating mantle was placed 380.0 grams (3.2 moles) of 2-nitro-2-methyl-1-propanol and 194.7 grams (1.6 moles) of monoethanolamine along with 300 cubic centimeters of toluene. This mixture was then heated to reflux and 64.7 cubic centimeters of water distilled over in the Dean Stark trap during the course of several hours. The reaction mixture was allowed to reflux until no water distilled over indicating that the reaction was complete. On cooling, the toluene and unreacted starting materials were then distilled away from the product under vacuum (15–20 torr) to give a viscous pale orange product. A yield of 492.0 grams or 95.1 percent of crude bis(2-nitroisopropylmethyl) ethanolamine was obtained. The IR-spectrum was consistent with bis(2-nitroisopropylmethyl) ethanolamine.

EXAMPLE 6

In a 2 liter, three-necked flask equipped with a magnetic stir bar, Dean Stark trap, reflux condenser, and heating mantle was placed 812.5 grams (6.8 moles) of 2-nitro-2-methyl-1-propanol and 256.0 grams (3.4 moles) of monoisopropanolamine along with 450 cubic centimeters of toluene. This mixture was then heated to reflux and 36.0 cubic centimeters of water distilled over in the Dean Stark trap during the course of several hours. The reaction mixture was allowed to reflux until no water distilled over indicating that the reaction was complete. On cooling, the toluene and unreacted starting materials were then distilled away from the product under vacuum (15–20 torr) to give a viscous pale orange product. A yield of 697.0 grams or 73.7 percent of crude bis(2-nitroisopropylmethyl) isopropanolamine was obtained. The IR-spectrum was consistent with bis(2-nitroisopropylmethyl) isopropanolamine.

EXAMPLE 7

In a 2 liter, three-necked flask equipped with a magnetic stir bar, Dean Stark trap, reflux condenser, and heating mantle was placed 363.4 grams (3.1 moles) of 2-nitro-2-methyl-1-propanol and 114.5 grams (1.5 moles) of monoisopropanolamine along with 300 cubic centimeters of toluene. This mixture was then heated to reflux and 49.4 cubic centimeters of water distilled over in the Dean Stark trap during the course of several hours. The reaction mixture was allowed to reflux until no water distilled over indicating that the reaction was complete. On cooling, the toluene and unreacted starting materials were then distilled away from the product under vacuum (15–20 torr) to give a viscous pale orange product. A yield of 327.0 grams or 77.0 percent of crude bis(2-nitroisopropylmethyl) isopropanolamine was obtained. The IR-spectrum was consistent with bis(2-nitroisopropylmethyl) isopropanolamine.

EXAMPLE 8

In a 1000 milliliter rocking autoclave was placed 98.2 grams (0.45 mole) of bis(2-nitroisopropylmethyl)amine, 400 milliliters methyl alcohol, and 11 grams of Raney nickel. The autoclave was sealed and pressured with hydrogen gas. The reduction of the dinitroamine was conducted at 1000–1500 pounds per square inch hydrogen pressure and 20°–65° C. until the hydrogen absorption was complete. On cooling, the reaction mixture was filtered from the catalyst and the methyl alcohol was removed by evaporation. The crude product was then distilled under high vacuum (boiling point = 61°–62° C. at 1.5 torr) to give 57.0 grams or 80 percent yield of the colorless triamine, bis(2-aminoisopropylmethyl)amine. The IR, proton NMR, carbon 13 NMR, and GC-mass spectra were consistent with the triamine as was the elemental analysis:

Calculated for $C_8H_{21}N_3$: C, 60.38%; H, 13.20%; N, 26.42%. Found: C, 59.11%; H, 12.54%; N, 25.64%.

EXAMPLE 9

In a 1000 milliliter rocking autoclave was placed 106.3 grams (0.49 mole) of bis(2-nitroisopropylmethyl)amine, 400 milliliters of methyl alcohol, and 6.5 grams of Raney nickel catalyst. The autoclave was sealed and pressured with hydrogen gas. The reduction of the dinitroamine was conducted at 800–1600 pounds per square inch hydrogen pressure and 20°–90° C. until the hydrogen absorption was complete. On cooling, the reaction mixture was filtered from the catalyst and the methyl alcohol was removed by evaporation. The crude product was then distilled under high vacuum (boiling point = 61°–62° C. at 1.5 torr) to give 98 percent yield of the colorless triamine, bis(2-aminoisopropylmethyl)amine.

EXAMPLE 10

In a 1000 milliliter rocking autoclave was placed 164.6 grams (0.6 mole) of bis(2-nitroisopropylmethyl) ethanolamine, 400 cubic centimeters of methyl alcohol, and 9.9 grams of Raney nickel (6 percent). The autoclave was sealed and pressured with hydrogen gas. The initial reduction of the dinitroaminoalcohol was conducted at 800–1475 pounds per square inch hydrogen pressure and <100° F. to 120° F. until the hydrogen absorption was complete. Afterward, the reaction mixture was post-heated at 200°–205° F. for two hours. On cooling, the reaction mixture was filtered from the catalyst and the methyl alcohol was removed by evaporation. The IR-spectrum showed no remaining nitro peaks. The crude product amounted to 116.4 grams or 91.0 percent yield. The crude product was further purified by vacuum distillation. The colorless bis(2-aminoisopropylmethyl) ethanolamine boiled at 158°–160° C. (15 torr). The nitrogen elemental analysis was consistent with the triaminoalcohol:

Calculated for $C_{10}H_{25}N_3O$: N, 20.7%. Found: N, 20.4%.

EXAMPLE 11

In a 1000 milliliter rocking autoclave was placed 162.6 grams (0.6 mole) of bis(2-nitroisopropylmethyl) ethanolamine, 400 cubic centimeters of methyl alcohol, and 9.8 grams of Raney nickel (6 percent). The autoclave was sealed and pressured with hydrogen gas. The initial reduction of the dinitroaminoalcohol was conducted at 775–1400 pounds per square inch hydrogen pressure and 110°–140° F. until the hydrogen absorption was complete. Afterward, the reaction mixture was post-heated at 200°–215° F. for two hours. On cooling, the reaction mixture was filtered from the catalyst and the methyl alcohol was removed by evaporation. The IR-spectrum showed no remaining nitro peaks. The crude product amounted to 112.6 grams or 89.4 percent yield. The crude product was further purified by vacuum distillation. The colorless bis(2-aminoisopropylmethyl) ethanolamine boiled at 158°–160° C. (15 torr).

EXAMPLE 12

In a 1000 milliliter rocking autoclave was placed 112.6 grams (0.4 mole) of bis(2-nitroisopropylmethyl) ethanolamine, 400 cubic centimeters of methyl alcohol, and 6.9 grams of Raney nickel (6 percent). The autoclave was sealed and pressured with hydrogen gas. The initial reduction of the dinitroaminoalcohol was conducted at 1000–1700 pounds per square inch hydrogen pressure and 100°–101° F. until the hydrogen absorption was complete. Afterward, the reaction mixture was post-heated at 188°–194° F. for two hours. On cooling, the reaction mixture was filtered from the catalyst and the methyl alcohol was removed by evaporation. The IR-spectrum showed no remaining nitro peaks. The crude product amounted to 70.4 grams or 80.6 percent yield. The crude product was further purified by vacuum distillation. The colorless bis(2-aminoisopropylmethyl) ethanolamine boiled at 158°–160° C. (15 torr).

EXAMPLE 13

In a 1000 milliliter rocking autoclave was placed 156.1 grams (0.6 mole) of bis(2-nitroisopropylmethyl) ethanolamine, 400 cubic centimeters of methyl alcohol, and 9.4 grams of Raney nickel catalyst (6 percent). The autoclave was sealed and pressured with hydrogen gas. The initial reduction of the dinitroaminoalcohol was conducted at 300–1600 pounds per square inch hydrogen pressure and 101°–108° F. until the hydrogen absorption was complete. Afterward, the reaction mixture was post-heated at 100°–190° F. for two hours. On cooling, the reaction mixture was filtered from the catalyst and the methyl alcohol was removed by evaporation. The IR-spectrum showed no remaining nitro peaks. The crude product was further purified by vacuum distillation. The colorless bis(2-aminoisopropylmethyl) ethanolamine boiled at 158°–160° C. (15 torr).

EXAMPLE 14

In a 1000 milliliter rocking autoclave was placed 62.9 grams (0.2 mole) of bis(2-nitroisopropylmethyl) ethanolamine, 400 cubic centimeters of methyl alcohol, and 4.7 grams of Raney nickel catalyst (6 percent). The autoclave was sealed and pressured with hydrogen gas. The initial reduction of the dinitroaminoalcohol was conducted at 1600–1650 pounds per square inch hydrogen pressure and 100°–190° F. until the hydrogen absorption was complete. Afterward, the reaction mixture was post-heated at 250° F. for two hours. On cooling, the reaction mixture was filtered from the catalyst and the methyl alcohol was removed by evaporation. The IR-spectrum showed no remaining nitro peaks. The crude product amounted to 48.8 grams or 99 percent yield. The crude product was further purified by vacuum distillation. The colorless bis(2-aminoisopropylmethyl) ethanolamine boiled at 158°–160° C. (15 torr).

EXAMPLE 15

In a 1000 milliliter rocking autoclave was placed 158.7 grams (0.6 mole) of bis(2-nitroisopropylmethyl) ethanolamine, 400 cubic centimeters of methyl alcohol, and 9.5 grams of Raney nickel catalyst (6 percent). The autoclave was sealed and pressured with hydrogen gas. The initial reduction of the dinitroaminoalcohol was conducted at 800–1450 pounds per square inch hydrogen pressure and 100°–165° F. until the hydrogen absorption was complete. Afterward, the reaction mixture was post-heated at 150° F. for two hours. On cooling, the reaction mixture was filtered from the catalyst and the methyl alcohol was removed by evaporation. The IR-spectrum showed no remaining nitro peaks. The crude product was further purified by vacuum distillation. The colorless bis(2-aminoisopropylmethyl) ethanolamine boiled at 158°–160° C. (15 torr).

EXAMPLE 16

In a 1000 cubic centimeters rocking autoclave was placed 157.4 grams (0.6 mole) of bis(2-nitroisopropylmethyl) monoisopropanolamine, 400 cubic centimeters of methyl alcohol and 9.8 grams of Raney nickel catalyst (6 percent). The autoclave was sealed and pressured with hydrogen gas. The initial reduction of the dinitroaminoalcohol was conducted at 1000–1750 pounds per square inch hydrogen pressure and 100°–145° F. until the hydrogen absorption was complete. Afterward, the reaction mixture was post-heated at 145° F. for two hours. On cooling, the reaction mixture was filtered from the catalyst and the methyl alcohol was removed by evaporation. The IR-spectrum showed no remaining nitro peaks. The colorless bis(2-aminoisopropylmethyl) monoisopropanolamine boiled at 150° C. (15 torr). The nitrogen elemental analysis was consistent with the triaminoalcohol:

Calculated: for $C_{11}H_{27}N_3O$: N, 19.4%. Found: N, 18.7%.

EXAMPLE 17

In a 1000 cubic centimeters rocking autoclave was placed 104.7 grams (0.4 mole) of bis(2-nitroisopropylmethyl) monoisopropanolamine, 400 cubic centimeters of methyl alcohol and 6.3 grams of Raney nickel catalyst (6 percent). The autoclave was sealed and pressured with hydrogen gas. The initial reduction of the dinitroaminoalcohol was conducted at 1000–1750 pounds per square inch hydrogen pressure and 100°–150° F. until the hydrogen absorption was complete. Afterward, the reaction mixture was post-heated at 190°–210° F. for two hours. On cooling, the reaction mixture was filtered from the catalyst and the methyl alcohol was removed by evaporation. The IR-spectrum showed no remaining nitro peaks. The colorless bis(2-aminoisopropylmethyl) monoisopropanolamine boiled at 150° C. (15 torr).

EXAMPLE 18

In a 1000 cubic centimeters rocking autoclave was placed 150.1 grams (0.5 mole) of bis(2-nitroisopropylmethyl) cyclohexylamine, ~500 cubic centimeters of methyl alcohol, and 9.0 grams of Raney nickel catalyst (6 percent). The autoclave was sealed and pressured with hydrogen gas. The initial reduction of the dinitroamine was conducted at 200–1575 pounds per square inch hydrogen pressure and 100°–1450° F. until the hydrogen absorption was complete. Afterward, the reaction mixture was post-heated at 200° F. for two hours. On cooling, the reaction mixture was filtered from the catalyst and the methyl alcohol was removed by evaporation. The IR-spectrum showed no remaining nitro peaks. The colorless bis(2-aminoisopropylmethyl) cyclohexylamine boiled at 110° C. (15 torr).

EXAMPLE 19

In a 1000 cubic centimeters rocking autoclave was placed 122.3 grams (0.5 mole) of bis(2-nitroisopropylmethyl) propylamine, 400 cubic centimeters of methyl alcohol, and 7.5 grams of Raney nickel catalyst (6 percent). The autoclave was sealed and pressured with hydrogen gas. The initial reduction of the dinitroamine was conducted at 400–1550 pounds per square inch hydrogen pressure and 100°–155° F. until the hydrogen absorption was complete. Afterward, the reaction mixture was post-heated at 200° F. for two hours. On cooling, the reaction mixture was filtered from the catalyst and the methyl alcohol was removed by evaporation. The IR-spectrum showed no remaining nitro peaks. The crude product amounted to 93.8 grams or 98.3 percent yield. The crude product was further purified by distillation under vacuum (15 torr) to give colorless bis(2-aminoisopropylmethyl) propylamine.

EXAMPLE 20

To 100 parts of epoxy resin based on diglycidyl ether of bisphenol A,

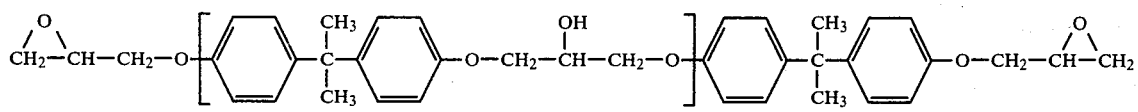

(n=0.2, WPE=185–195), 17 or 18 parts of bis(2-aminoisopropylmethyl)amine prepared in Example 1 was added. After mixing thoroughly for two minutes and centrifuging for three minutes, this resin mixture was placed in the aluminum mold and became hard, infusible and insoluble after the cure conditions shown in the following table. The glass transition temperatures (Tg) of the cured products measured with Differential Scanning Colorimeter (Perkin-Elmer DSC-2) are listed in Table I (Entry 1–5).

TABLE I

| EN-TRY | PHR | CURING CONDITIONS | Tg (°C.) |
|---|---|---|---|
| 1 | 17 | 2 hours/80° C. + 2 hours/150° C. | 123.1 |
| 2 | 17 | 2 hours/80° C. + 4 hours/150° C. | 131.6 |
| 3 | 17 | 2 hours/80° C. + 6 hours/150° C. | 136.3 |
| 4 | 17 | 2 hours/80° C. + 2 hours/170° C. | 137.0 |
| 5 | 18 | 2 hrs/80° C. + 2 hrs/150° C. + 1 hr/200° C. | 150.1 |

EXAMPLE 21

A mixture of 100 grams of epoxy resin described in Example 5 and bis(2-aminoisopropylmethyl)amine (BAIMA) made in Example 1 was mixed as in Example 5. The mixture in the aluminum container was placed in a constant temperature water bath at 25° C. The gel time of the resin mixture was measured with Teram Gelation Timer (GT-4). For comparison, five other batches of the epoxy resin were mixed with conventional curing agents based on various polyamines. The curing agents were diethylene triamine (DETA), isophorone diamine (IPD), 1,2-diaminocyclohexane (1,2-DAC), 2-methyl-2,4-pentanediamine (2,4-MPD), 2-methyl-1,5-pentanedaimine (1,5-MPD). The results are listed in Table II.

TABLE II

| Curing Agents | phr | Gel Time (min.) |
|---|---|---|
| BAIMA | 17.0 | 436.1 |
| DETA | 13.0 | 36.3 |
| IPD | 23.0 | 109.2 |
| 1,2-DAC | 17.0 | 126.8 |
| 2,4-MPD | 18.0 | 228.4 |
| 1,5-MPD | 15.5 | 70.3 |

EXAMPLE 22

To 100 parts of epoxy resin based on diglycidyl ether of bisphenol A (see Example 20), 25.5–30.0 parts of bis(2-aminoisopropylmethyl) monoethanolamine prepared in Example 10 were added. After mixing thoroughly for two minutes and centrifuging for three minutes, this resin mixture was placed in an aluminum pan and became hard, infusible and insoluble after the cure conditions shown in the following table. The glass transition temperatures (Tg) of the cured products measured with differential Scanning Colorimeter (Perkin-Elmer DSC-2) are listed in Table III (Entry 1–11).

TABLE III

| ENTRY | PHR | CURE CYCLE | Tg (°C.) |
|---|---|---|---|
| 1 | 25.5 | A | 80.5 |
| 2 | 25.5 | B | 81.5 |
| 3 | 26.5 | A | 77.5 |
| 4 | 26.5 | B | 78.0 |
| 5 | 27.5 | B | 78.5 |
| 6 | 28.0 | A | 76.0 |
| 7 | 28.0 | B | 79.5 |
| 8 | 28.6 | A | 80.0 |
| 9 | 29.0 | A | 76.5 |
| 10 | 29.5 | A | 78.0 |
| 11 | 30.0 | A | 78.5 |

A - Cure Cycle = 2 hours/80° C. + 2 hours/150° C.
B - Cure Cycle = 2 hours/80° C. + 2 hours/150° C. + 1 hour/200° C.

EXAMPLE 23

To 100 parts of epoxy resin based on diglycidyl ether of bisphenol A (see Example 20 ), 28.0–29.5 parts of bis(2-aminoisopropylmethyl) monoisopropanolamine prepared in Example 16 were added. After mixing thoroughly for two minutes and centrifuging for three minutes, this resin mixture was placed in an aluminum pan and became hard, infusible and insoluble after a cure of 2 hours at 80° C. and 2 hours at 150° C. The glass transition temperatures (Tg) of the cured products measured with differential Scanning Colorimeter (Perkin-Elmer DSC-2) are listed in Table IV (Entry 1–4).

TABLE IV

| ENTRY | PHR | Tg (°C.) |
|---|---|---|
| 1 | 28.0 | 79.0 |
| 2 | 28.5 | 71.5 |
| 3 | 29.0 | 74.5 |
| 4 | 29.5 | 77.5 |

What is claimed is:

1. A nitrogen-containing compound selected from the group consisting of:

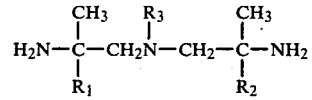

wherein $R_1$ and $R_2$ are lower alkyl and $R_3$ is selected from hydrogen, lower alkyl, aryl and

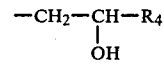

wherein $R_4$ is selected from H and lower alkyl.

2. The nitrogen-containing compound of claim 1, wherein $R_1$ and $R_2$ are methyl and $R_3$ is H.

3. The nitrogen-containing compounds of claim 1, wherein $R_1$ is H, $R_2$ is selected from H, methyl and ethyl and $R_3$ is H.

4. The nitrogen-containing compound of claim 1, where $R_1$ and $R_2$ are methyl and $R_3$ is selected from lower alkyl and aryl.

5. The nitrogen-containing compound of claim 1 wherein $R_1$ is H, $R_2$ is H or lower alkyl and $R_3$ is lower alkyl or aryl.

6. The nitrogen-containing compound of claim 1, wherein $R_1$ and $R_2$ are methyl and $R_3$ is:

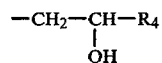

wherein $R_4$ is selected from H and lower alkyl.

7. The nitrogen-containing compound of claim 1, where $R_1$ and $R_2$ are each independently selected from H and lower alkyl and $R_3$ is

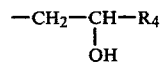

where $R_4$ is selected from H and lower alkyl.

8. A curable epoxy resin composition comprising an epoxy resin and an epoxy resin curing agent, wherein the epoxy resin curing agent is represented by the formula:

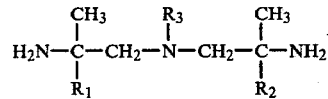

wherein $R_1$ and $R_2$ are each independently selected from hydrogen and lower alkyl and $R_3$ is selected from hydrogen, lower alkyl, aryl and

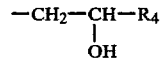

9. The curable epoxy resin composition of claim 8, wherein said epoxy resin is selected from the polyepoxides having at least two

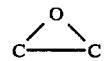

groups.

10. The epoxy resin composition of claim 9, wherein said

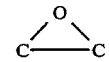

groups are terminal groups.

11. The epoxy resin composition of claim 9, wherein said epoxy resin is a diglycidyl ether of bis-phenol.

12. The epoxy resin composition of claim 8, wherein said epoxy resin curing agent is represented by the formula set forth in claim 8 and wherein $R_1$ and $R_2$ are methyl and $R_3$ is H.

13. A cured epoxy resin product comprising the product obtained on curing a curable epoxy resin composition comprising an epoxy resin and an epoxy resin curing agent having the formula

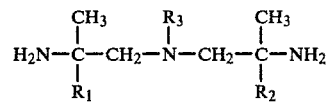

wherein $R_1$ and $R_2$ are each independently selected from hydrogen and lower alkyl and $R_3$ is selected from hydrogen, lower alkyl, aryl and

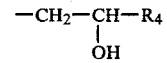

14. In a method for curing an epoxy resin composition comprising incorporating an epoxy resin curing agent into an epoxy resin and heating the combination of the epoxy resin and the epoxy curing agent, the improvement which comprises said epoxy resin curing agent being represented by the formula:

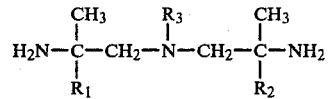

wherein $R_1$ and $R_2$ are each independently selected from hydrogen and lower alkyl and $R_3$ is selected from hydrogen, lower alkyl, aryl and

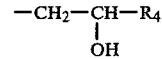

* * * * *